(12) United States Patent
Li et al.

(10) Patent No.: US 8,571,204 B2
(45) Date of Patent: Oct. 29, 2013

(54) APPARATUS AND METHOD FOR ECHO CONTROL IN PARAMETER DOMAIN

(75) Inventors: Jie Li, Shenzhen (CN); Junbin Liang, Shenzhen (CN); Yulong Li, Shenzhen (CN); Jingfan Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/555,502

(22) Filed: Jul. 23, 2012

(65) Prior Publication Data

US 2013/0028409 A1     Jan. 31, 2013

Related U.S. Application Data (63) Continuation of application No. PCT/CN2011/077587, filed on Jul. 25, 2011.

(51) Int. Cl.
*H04M 9/08* (2006.01)

(52) U.S. Cl.
USPC ................................. 379/406.04; 379/406.01

(58) Field of Classification Search
USPC ...................... 379/3, 406.01–406.16; 455/570
See application file for complete search history.

(56) References Cited

U.S. PATENT DOCUMENTS

| | | | |
|---|---|---|---|
| 6,081,776 A | 6/2000 | Grabb et al. | |
| 8,032,365 B2 * | 10/2011 | Sukkar | 704/228 |
| 2004/0076271 A1 | 4/2004 | Koistinen et al. | |
| 2004/0243404 A1 * | 12/2004 | Cezanne et al. | 704/225 |
| 2006/0215683 A1 | 9/2006 | Sukkar et al. | |
| 2006/0217983 A1 | 9/2006 | Sukkar | |
| 2007/0160154 A1 | 7/2007 | Sukkar | |
| 2008/0152156 A1 | 6/2008 | Gao | |
| 2009/0063142 A1 | 3/2009 | Sukkar | |
| 2010/0063809 A1 | 3/2010 | Trump | |

FOREIGN PATENT DOCUMENTS

| | | | |
|---|---|---|---|
| CN | 1504042 A | | 6/2004 |
| CN | 1917038 A | | 2/2007 |
| CN | 101617363 A | | 12/2009 |
| EP | 1 521 241 A1 | | 4/2005 |
| EP | 1 544 848 A2 | | 6/2005 |
| WO | WO 01/03316 A1 | | 1/2001 |
| WO | WO 2008/051401 A1 | | 5/2008 |
| WO | WO 2009/029076 A1 | | 3/2009 |

OTHER PUBLICATIONS

Supplementary European Search Report dated Dec. 7, 2012 in connection with European Patent Application No. EP 11 85 5919.

(Continued)

*Primary Examiner* — MD S Elahee
*Assistant Examiner* — Akelaw Teshale (57) ABSTRACT

The present invention relates to call voice signal processing, and particularly, to apparatus and method for echo control in parameter domain. The apparatus includes: an echo detection module configured to extract parameter domain characteristic parameters of a far-end output signal and a near-end input signal, respectively, through parameter domain decoding, and detect whether a near-end input signal frame is an echo frame according to the parameter domain characteristic parameters; and a transition module configured to re-quantize the fixed codebook gain, the adaptive codebook gain and an LSF prediction error in the near-end input signal frame when the echo detection module detects the near-end input signal frame as a non-echo frame, and replace the original fixed codebook gain, the original adaptive codebook gain and the original LSF in the near-end input signal frame.

19 Claims, 9 Drawing Sheets

(56) References Cited

OTHER PUBLICATIONS

International Search Report dated May 3, 2012 in connection with International Patent Application No. PCT/CN2011/077587.

Search Report dated Mar. 28, 2013 in connection with Chinese Patent Application No. 201180003907.8.
"Design and Implementation of Echo Canceller Based on DSP", Journal of Guangdong University of Technology, vol. 19, No. 1, Mar. 2002, 6 pages.

* cited by examiner

APPARATUS AND METHOD FOR ECHO CONTROL IN PARAMETER DOMAIN

CROSS-REFERENCE TO RELATED APPLICATIONS

This application is a continuation of International Application No. PCT/CN2011/077587, filed on Jul. 25, 2011, which is hereby incorporated by reference in its entirety.

FIELD OF THE INVENTION

The present invention relates to the field of call voice signal processing, and particularly, to an apparatus and a method for echo control in a parameter domain.

BACKGROUND OF THE INVENTION

The call voice quality is one of the critical indexes for measuring the telecom network, and also a core competence of the telecom equipment manufacturers. In order to ensure the voice quality during the call, a key point is to effectively process the echoes and other interference sources generated during the call, so as to improve the subjective feelings of both parties concerned in the call.

Figure 1:
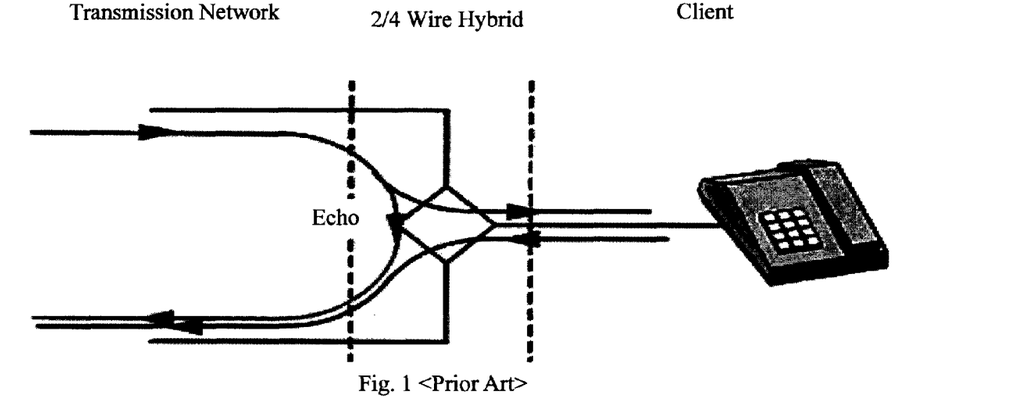
FIG. 1 is a schematic diagram of the production mechanism of an electric echo provided by the prior art.
Figure 2:
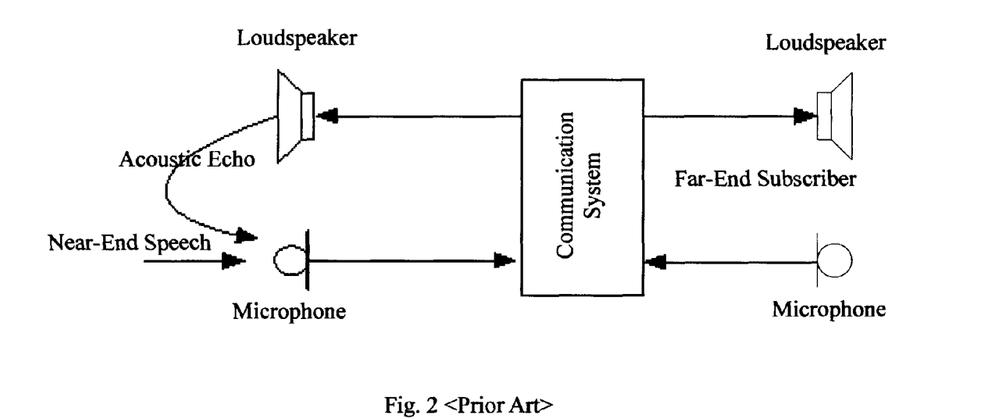
FIG. 2 is a schematic diagram of the production mechanism of an acoustic echo provided by the prior art.

The echoes generated during the call may be classified into electric echo and acoustic echo according to their sources. In which, the mechanism for producing the electric echo is illustrated in FIG. 1. Since the working state of the 2/4 wire hybrid in the telecom network is closely related to the characteristics of the external line impedance, the transmitting end and the receiving end cannot be completely isolated from each other when the hybrid does not match the external line impedance. Thus, as illustrated in FIG. 1, different phones and different lengths of subscriber lines cause a signal leakage at the hybrid, and the voice of the subscriber can be heard by the counterpart subscriber. The mechanism for producing the acoustic echo is illustrated in FIG. 2, mainly owing to the coupling between the loudspeaker and the microphone. Referring to FIG. 2, the far-end acoustic signal played by the near-end loudspeaker always has a part transmitted back to the far-end through the microphone, and the far-end subscriber hears his own voice again.

The conventional echo control algorithm is implemented based on the Pulse Code Modulation (PCM) in the linear domain. The so called linear domain is a mode based on direct sample point value, and when the communication link has a codec compression part, corresponding decoder is required to completely decode the compressed code stream and recover to the sample point value. It is adaptive to the scenario where the passed network elements require a decoding or the input is PCM in the linear domain. However, with the occurrences of the Tandem Free Operation (TFO) and the Transcoder Free Operation (TrFO) in recent years, it is not required to perform multiple times of transforms of speech codec between the transmitting and receiving ends, thus the conventional echo control algorithm is no longer applicable, and characteristic parameters in the parameter domain shall be obtained through decoding in the parameter domain to perform an echo control in the parameter domain. The so called decoding in the parameter domain means only partially decoding the compressed code stream to extract the characteristic parameters in the parameter domain of each frame, including fixed codebook gain, adaptive codebook gain, line spectrum frequency, etc. The echo control is implemented by modifying the characteristic parameters in the parameter domain in the compressed code stream, without recovering the compressed code stream to the sample point value through the decoder.

When an echo control is performed in the parameter domain, the input and output are all compressed code signals, thus for some encoding types such as Adaptive Multi Rate Codec (AMR) and Enhanced Full Rate Codec (EFR), the frames are associated with each other, and it shall not simply and independently perform the echo control for a certain frame. Particularly, during a handover between echo and non-echo, some special processing is required to achieve a more natural transition between echo and non-echo.

Figure 3:
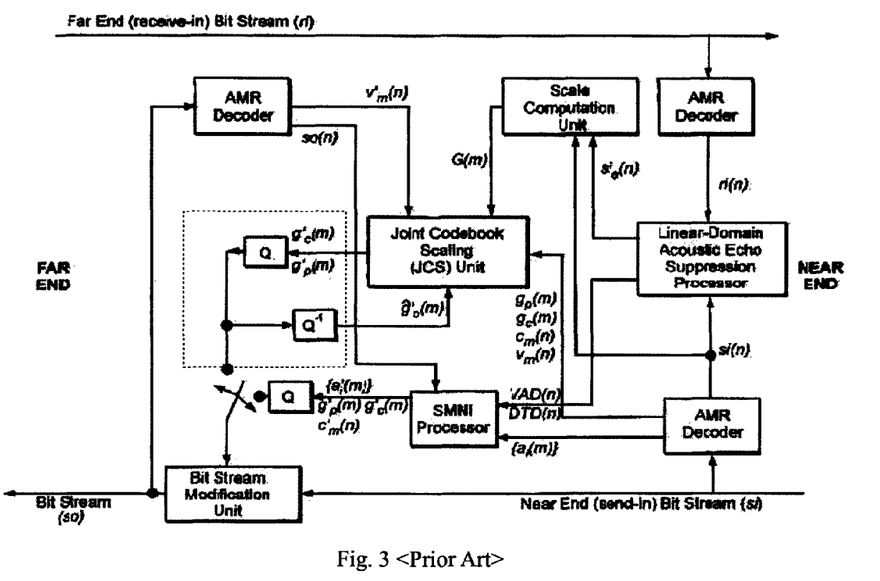
FIG. 3 is a structure schematic diagram of an apparatus for echo control in a parameter domain provided by the prior art, which is applicable to TFO/TrFO scenario.

The prior art provides a method for echo control applicable to TFO/TrFO scenarios. The method performs a transition between echo and non-echo by re-quantizing and outputting the fixed codebook gain and the adaptive codebook gain in the near-end input signal. FIG. 3 illustrates a structure diagram of an apparatus provided by the prior art that implements an echo control in the parameter domain through the above method.

However, during the transition between echo and non-echo in the prior art, when related processing of the code type signals such as AMR and EFR are to be made, the quantization of a parameter is associated with the prediction error of the parameter in the previous frame because the frames of those signals are associated with each other, while the prior art does not re-quantize the related linear prediction coefficients. Thus when the signals using the above coding mode are processed in the prior art, there is a risk that the finally decoded linear prediction parameters may be abnormal, resulting in signal mutations, then the handover between echo and non-echo cannot be smoothly transited.

SUMMARY OF THE INVENTION

An objective of the present invention is to provide an apparatus for echo control in a parameter domain, and intended to solve the problem in the prior art that the handover between echo and non-echo cannot be transited naturally when the transition from echo and non-echo is treated.

The embodiments of the present invention are implemented as follows. An apparatus for echo control in a parameter domain, comprising:

an echo detection module configured to extract parameter domain characteristic parameters of a far-end output signal and a near-end input signal, respectively, through a parameter domain decoding, and detect whether a near-end input signal frame is an echo frame according to the parameter domain characteristic parameters, wherein the parameter domain characteristic parameters comprise a Line Spectrum Frequency (LSF), a fixed codebook gain and an adaptive codebook gain; and a transition module configured to re-quantize the fixed codebook gain, the adaptive codebook gain and an LSF prediction error in the near-end input signal frame when the echo detection module detects the near-end input signal frame as a non-echo frame, and replace the original fixed codebook gain, the original adaptive codebook gain and the original LSF in the near-end input signal frame.

Another objective of the present invention is to provide a method for echo control in a parameter domain, comprising:

detecting whether a near-end input signal frame is an echo frame according to parameter domain characteristic parameters of a far-end output signal and a near-end input signal, wherein the parameter domain characteristic parameters comprise LSF, fixed codebook gain and adaptive codebook gain; and when the near-end input signal frame is detected as an echo frame, re-quantizing the fixed codebook gain, the adaptive codebook gain and the LSF prediction error in the near-end input signal frame to replace the original fixed codebook gain, the original adaptive codebook gain and the original LSF in the near-end input signal frame, respectively.

The embodiments of the present invention control the echo generated during the call in the parameter domain. As compared with the conventional method for echo control in the linear domain which requires the compressed code stream to be completely decoded, the present invention greatly improves the echo control efficiency. When a non-echo frame is detected, the handover between echo and non-echo is performed by re-quantizing the fixed codebook gain and the adaptive codebook gain in the non-echo frame. Meanwhile, considering that the LSF in the non-echo frame is associated with the LSF prediction error of the previous frame, the LSF prediction error of the non-echo frame is re-quantized to replace the original LSF, which reduces the risk that the LSF finally obtained by decoding may be abnormal, thereby avoiding the signal mutation, and realizing a smooth transition during the handover between echo and non-echo.

DETAILED DESCRIPTION OF THE PREFERRED EMBODIMENTS

In the parameter domain, during the control of echo generated in a call, when a handover between echo and non-echo is to be made, according to the embodiment of the present invention, the LSF prediction error of the current frame is re-quantized and output as the LSF in the near-end output signal, thus the association between the frames is taken into account during the handover process, thereby avoiding a hard handover between echo and non-echo caused by independently processing the current frame, and improving the transition effect between echo and non-echo.

Figure 4:
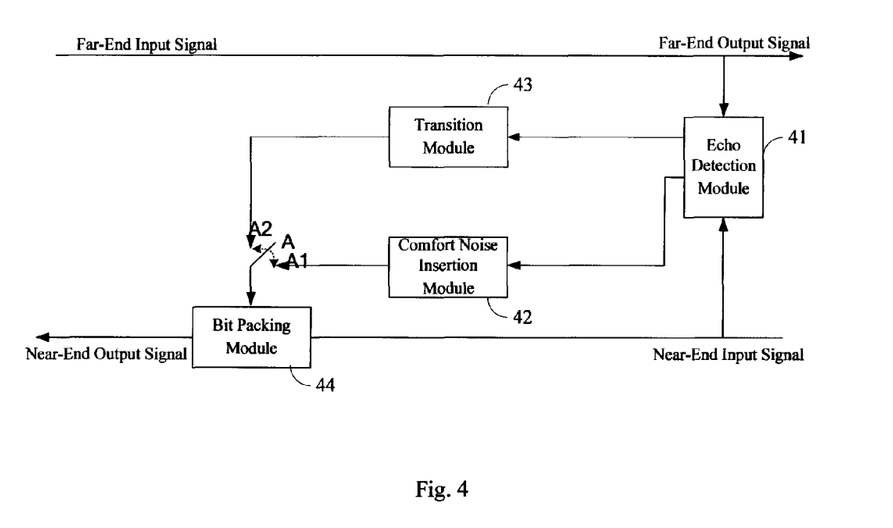
FIG. 4 is a structure block diagram of an apparatus for echo control in a parameter domain provided by an embodiment of the present invention.

FIG. 4 is a structure block diagram of an apparatus for echo control in a parameter domain provided by an embodiment of the present invention. For the convenience of description, only the parts related to the embodiment are illustrated.

Referring to FIG. 4, the apparatus includes an echo detection module 41, a comfort noise insertion module 42, a transition module 43 and a bit packing module 44.

The echo detection module 41 extracts parameter domain characteristic parameters of a far-end output signal and a near-end input signal, respectively, through a parameter domain decoding, and detects whether the near-end input signal is an echo according to the extracted parameter domain characteristic parameters.

Figure 5:
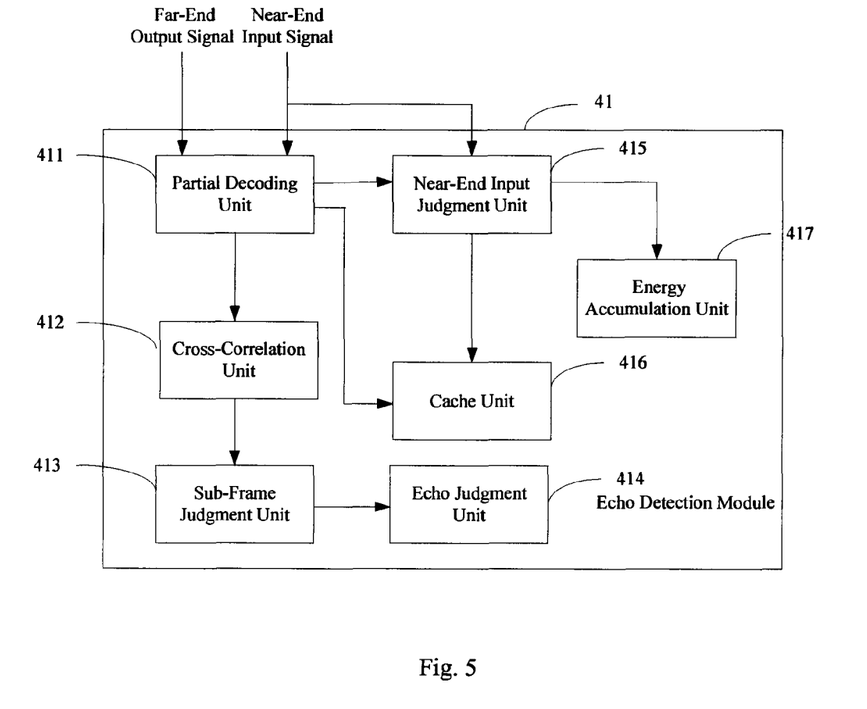
FIG. 5 is a specific structure diagram of an echo detection module of an apparatus for echo control in a parameter domain provided by an embodiment of the present invention.

FIG. 5 is a specific structure diagram of an echo detection module of an apparatus for echo control in a parameter domain provided by an embodiment of the present invention. Referring to FIG. 5, the echo detection module 41 includes a partial decoding unit 411, a cross-correlation unit 412, a sub-frame judgment unit 413, and an echo judgment unit 414.

The partial decoding unit 411 is configured to perform a partial decoding for the inputted far-end output signal and near-end input signal, respectively, so as to extract parameter domain characteristic parameters of the current sub-frames of the far-end output signal and the near-end input signal, including LSF, pitch period, fixed codebook gain, adaptive codebook gain, energy and other parameters.

The cross-correlation unit 412 is configured to take the two groups of parameter domain characteristic parameters of the near-end input signal and the far-end output signal extracted by the partial decoding unit 411 as near-end vectors and far-end (interval [fixed delay, fixed delay+dynamic delay]) vectors, respectively, perform a cross-correlation operation on the two groups of vectors to obtain a series of cross-correlation coefficients, and record the timing corresponding to each group of cross-correlation coefficients.

The sub-frame judgment unit 413 is configured to record the timing in a far-end interval corresponding to the maximum value of the series of cross-correlation coefficients as an initial echo delay, and judge whether both the far-end pitch period and near-end pitch period at this timing are less than a first predetermined threshold (i.e., judging the similarity between the far-end and near-end pitch periods), or judge whether both the far-end and near-end energies at this timing are less than a second predetermined threshold; and if yes, the sub-frame judgment unit 413 determines the current sub-frame of the near-end input signal as an echo sub-frame, otherwise determines it as a non-echo sub-frame.

To be noted, the partial decoding unit 411, the cross-correlation unit 412 and the sub-frame judgment unit 413 all make the calculations and judgments based on each sub-frame in the current frame of the far-end output signal and the near-end input signal.

The echo judgment unit 414 is configured to perform a synthetic judgment based on the judgment results of each sub-frame in the current frames, to judge whether the current frame of the near-end input signal is an echo frame or a non-echo frame, after the partial decoding unit 411, the cross-correlation unit 412 and the sub-frame judgment unit 413 all make the calculations and judgments for all sub-frames of the current frame.

In this embodiment, the synthetic judgment made by the echo judgment unit 414 shall firstly judge whether the current near-end input frame is a Silence Insertion Descriptor (SID) frame; if yes, determine the current near-end input frame as a non-echo frame regardless of whether any echo sub-frame is included; and if the current near-end input frame is not a SID frame, it is to perform the judgement based on a "majority rule". When the number of echo sub frames in the near-end input frame is larger than that of non-echo sub frames, it is determined the current near-end input frame is an echo frame. On the contrary, it is determined the current near-end input frame is a non-echo frame when the number of non-echo sub frames in the near-end input frame is larger than that of echo sub frames. The process of judging whether the current frame is an SID frame is performed by a near-end input judgment unit 415 to be described later, and herein is omitted.

According to an embodiment of the present invention, as illustrated in FIG. 5, the echo detection module 41 further includes a near-end input judgment unit 415, a cache unit 416 and an energy accumulation unit 417.

The near-end input judgment unit 415 is configured to perform an independent judgment on the near-end input signal, so as to judge whether the current frame of the near-end input is a silence frame by detecting whether the flag of the current frame in the near-end input signal indicates the current frame as an SID frame. In case the current frame is not judged as a silence frame, it is synthetically judged whether the current frame is a background noise frame based on the parameters obtained by partially decoding the near-end input signal, such as the calculated signal to noise ratio, frequency spectrum, energy, etc.

The cache unit 416 is configured to cache LSFs obtained by a partial decoding when the current frame of the near-end input signal is a silence frame or a background noise frame. In the embodiment, the cache unit 416 circularly caches the inputted LSFs, i.e., it only reserves eight frames of LSFs nearest to the current time.

The energy accumulation unit 417 is configured to perform a long-term average accumulation of the current frame energy obtained by partially decoding the near-end input signal, when the current frame of the near-end input signal is a silence frame or a background noise frame.

The results output by the cache unit 416 and the energy accumulation unit 417 are input into the comfort noise insertion module 42, so that the echo frame can be replaced more gently and naturally. The implementation will be described later, and herein is omitted.

In this embodiment, after the echo detection module 41 detects whether the near-end input signal is an echo, a switch A in FIG. 4 is controlled to be closed at A1 or A2 depending on the detection result. In case the detection result indicates that the current frame of the near-end input signal is an echo frame and the switch A is closed at A1, the result outputted by the echo detection module 41 is inputted into the comfort noise insertion module 42, so as to further cancel the echo frame. In case the detection result indicates that the current frame of the near-end input signal is a non-echo frame and the switch A is closed at A2, the result outputted by the echo detection module 41 is inputted into the transition module 43, and a transition from echo to non-echo is performed upon request.

The echo frame may be cancelled in a comfort noise insertion method or an echo attenuation method, herein the comfort noise insertion method is taken as an example. Generally during the call, about 40% of the time is the silent time, i.e., in about 40% of the time only the ambient noise rather than any voice information is transmitted, thus most part of those signals are mainly useless signals. If those signals are encoded in another encoding mode of a lower bit rate, the overhead of controlling the echo can be reduced and the bandwidth can be saved. Currently, the encoding modes such as AMR and EFR all introduce the discontinuous emission mechanism.

Figure 6:
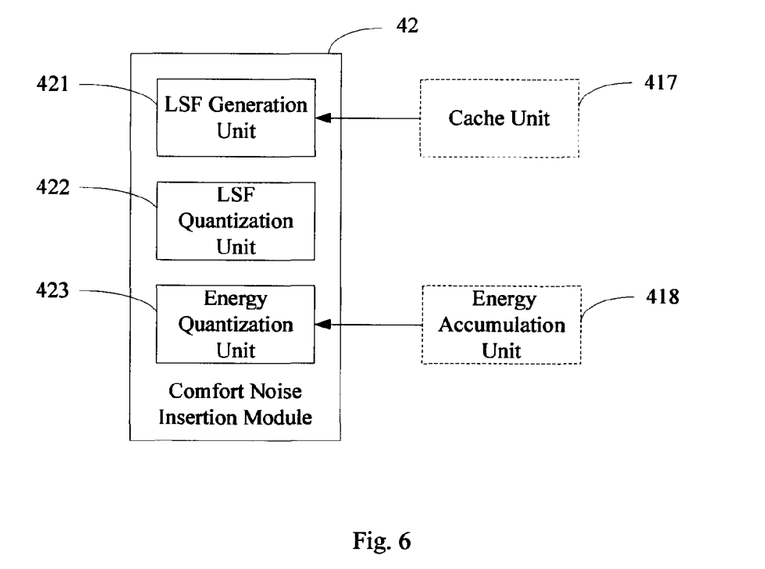
FIG. 6 is a specific structure diagram of a comfort noise insertion module of an apparatus for echo control in a parameter domain provided by an embodiment of the present invention.

Based on the above principle, the comfort noise insertion module 42 replaces the frame determined as echo in the echo detection module 41 with a silence frame or a background noise frame, encodes it using an SID encoding mode with a low bit rate, and then outputs the encoded frame. FIG. 6 is a specific structure diagram of a comfort noise insertion module of an apparatus for echo control in a parameter domain provided by an embodiment of the present invention, and the details are described as follows.

Referring to FIG. 6, the comfort noise insertion module 42 specifically includes an LSF generation unit 421 and an LSF quantization unit 422.

The LSF generation unit 421 is configured to generate a prior-quantization LSF to replace an LSF of the echo frame. During the generation, the LSF generation unit 421 firstly judges the current cache condition of the cache unit 416 to determine whether eight frames of LSFs are cached therein; if yes, the LSF generation unit 4 randomly selects one frame of LSF from the cache unit 416 and takes it as the prior-quantization LSF to replace the LSF of the echo frame. If the cached LSFs are less than eight frames, the LSF generation unit 4 transforms each frame of LSF having been cached into a Line Spectral Pair (LSP) and accumulates them to obtain an LSP average value, then transforms the LSP average value into an LSF which acts as the Prior-quantization LSF to replace the LSF of the echo frame.

The LSF quantization unit 422 is configured to perform corresponding quantization of the LSF outputted by the LSF generation unit 421 according to different encoding types, and then replace the original LSF of the near-end input signal.

Figure 7:
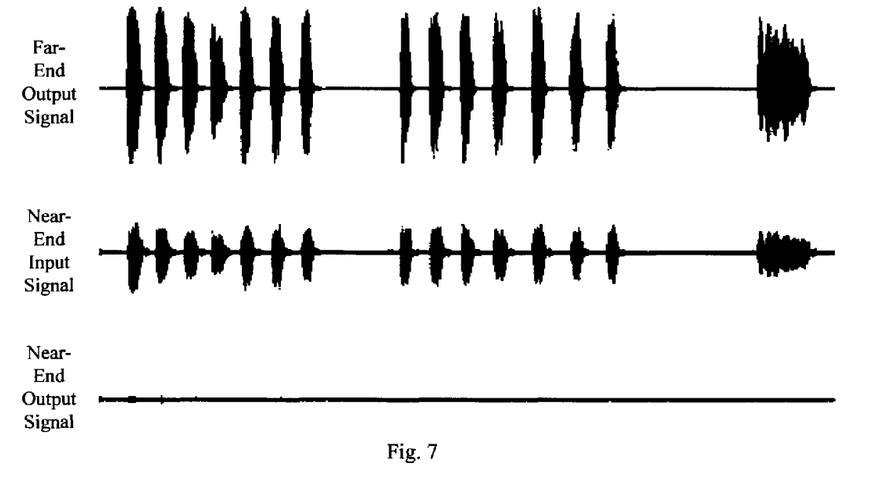
FIG. 7 is an optimization effect diagram of an echo cancellation performed by a comfort noise insertion module of an apparatus for echo control in a parameter domain provided by an embodiment of the present invention.

Through the above processing, the echo frame is replaced with an SID frame with a low bit rate, thus the echo control overhead is reduced and the bandwidth is saved. In addition, the time domain optimization effect achieved by replacing the echo frame with the SID frame is illustrated in FIG. 7. As can be seen from FIG. 7, the near-end input signal is an echo of the far-end output signal, and the level of the near-end output signal after frame replacement is matched with that of the near-end actual background noise, thereby canceling the echo. Correspondingly, the frequency spectrum of the near-end output signal after frame replacement also has the optimization effect of matching the frequency spectrum of the near-end actual background noise.

According to an embodiment of the present invention, the comfort noise insertion module 42 further includes an energy quantization unit 423.

The energy quantization unit 423 is configured to perform corresponding quantization of the average value of the long-term accumulated energy in the energy accumulation unit 417 according to the different encoding types, so as to replace the energy part of the near-end output signal (for the EFR encoding type, the energy part is corresponding to the fixed codebook gain part of the near-end output signal), thus the frame energy after the echo replacement is changed slowly and transited naturally, and the subjective experiences of the parties concerned in the call can be greatly improved.

In this embodiment, when the echo detection module 41 judges the current frame of the near-end input signal as a non-echo frame, the output of the echo detection module 41 is inputted into the transition module 43 in which the prediction error of the LSF of the current frame in the near-end input signal is re-quantized, thus the relationships between the frames are sufficiently considered, which greatly decreases the risk that there may be abnormal during the transition from echo to non-echo in the encoding modes such as AMR and EFR. The module is a key point of the present invention, and its specific structure is illustrated in FIG. 8, with the details described as follows.

Figure 8:
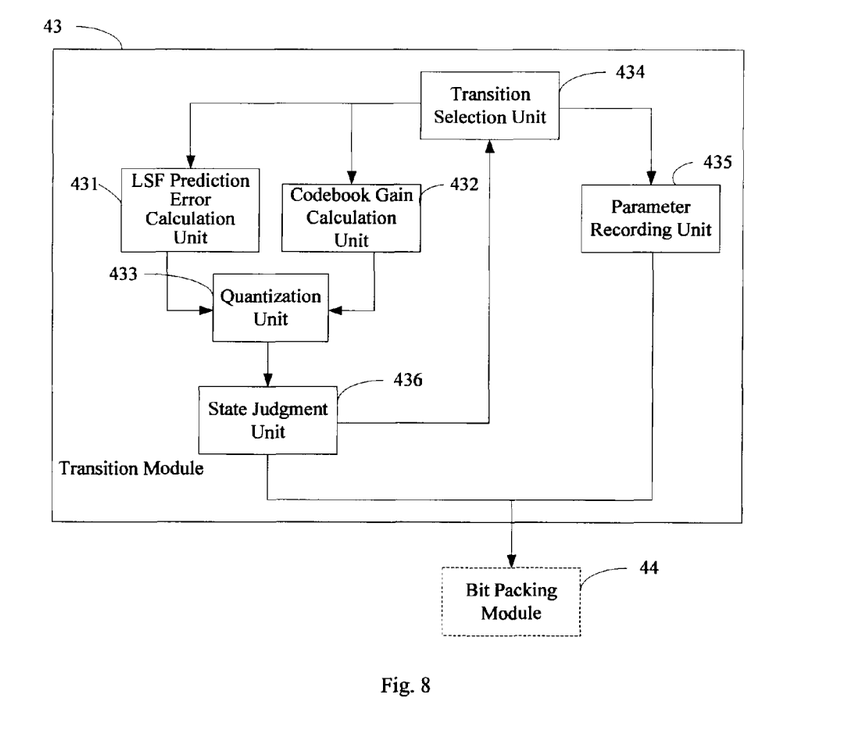
FIG. 8 is a specific structure diagram of a transition module of an apparatus for echo control in a parameter domain provided by an embodiment of the present invention.

Referring to FIG. 8, the transition module 43 includes an LSF prediction error calculation unit 431, a codebook gain calculation unit 432 and a quantization unit 433.

The LSF prediction error calculation unit 431 firstly multiplies the LSF prediction error of a previous frame in the near-end input signal with an LSF prediction error coefficient, and adds the multiplication result with an LSF average value to obtain an LSF prediction value of the current frame. Next, the LSF prediction error calculation unit 431 subtracts the LSF prediction value from the LSF obtained by partially decoding the near-end input signal to acquire an LSF prediction error of the current frame prior to quantization, and caches the LSF prediction error to be used in the LSF calculation for a next frame. In the embodiment, the LSF prediction error coefficient and the LSF average value are determined according to different signal encoding modes, and they are corresponding constants for different encoding modes.

In the embodiment of the present invention, through the LSF prediction error calculation unit 431, the relationships between the frames are sufficiently considered, which greatly decreases the risk that there may be abnormal in the transition from echo to non-echo under the encoding modes such as AMR and EFR. To be noted, the above LSF calculation mode is not limited to the encoding mode AMR or EFR, and it is also adaptive to the handover between echo and non-echo during an echo control in the parameter domain under other encoding mode.

The codebook gain calculation unit 432 is configured to limit the fixed codebook gain and the adaptive codebook gain obtained by partially decoding the near-end input signal. In order to avoid the abnormity caused by a waveform mutation during the handover between echo and non-echo, if the fixed codebook gain or the adaptive codebook gain obtained by the partial decoding exceeds 1, it shall be set as 1, so as to ensure that the excitation after the near-end output signal is decoded will not be mutated during the transition from echo to non-echo.

The quantization unit 433 is configured to re-quantize the LSFs and the codebook gains outputted by the LSF prediction error calculation unit 431 and the codebook gain calculation unit 432, respectively, and replace the original LSF, fixed codebook gain and adaptive codebook gain of the near-end input signal frame, respectively.

Figure 9:
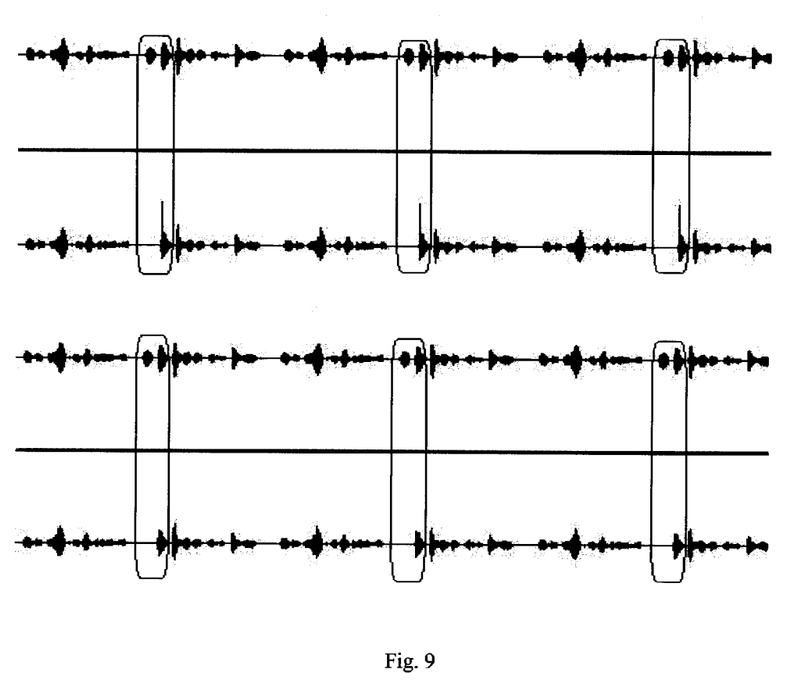
FIG. 9 is an optimization effect diagram of a transition between echo and non-echo performed by a transition module of an apparatus for echo control in a parameter domain provided by an embodiment of the present invention.

FIG. 9 is an optimization effect diagram of a transition between echo and non-echo performed using the above processing mode. The upper part is a comparison view of waveforms before and after signal processing without adding the LSF transition, clearly, in which there are several waveform mutations in the output signal waveform. And the lower part is a comparison view of waveforms before and after signal processing with the LSF transition added. It is clear that after the LSF prediction error is quantized during the transition, the waveform mutation no longer occurs, which greatly decreases the risk of waveform abnormity.

To be particularly pointed out, in the embodiment when a transition is to be made, the transition module 43 only modifies the LSF, the fixed codebook gain and the adaptive codebook gain in the near-end input signal, and then re-quantizes and outputs them, while other parameters will not be changed.

As an embodiment of the present invention, referring to FIG. 8, the transition module 43 further includes a transition selection unit 434, a parameter recording unit 435 and a state judgment unit 436.

The transition selection unit 434 is configured to determine whether a non-echo frame currently inputted into the transition module 43 needs to be transited.

The parameter recording unit 435 is configured to record some parameter domain characteristic parameters (e.g., the LSF prediction error to be used by the LSP calculation unit 431) obtained by partially decoding the non-echo frame, when the transition selection unit 434 determines that the non-echo frame currently inputted into the transition module 43 does not need to be transited, i.e., the previous frame of the current frame of the near-end input signal is also a non-echo frame. After that, the non-echo frame is outputted through a direct transparent transmission, and the LSF, the fixed codebook gain and the adaptive codebook gain no longer need to be recalculated, thus the processing overhead for echo control is well decreased.

The state judgment unit 436 is configured to perform an inverse quantization of the near-end input signal outputted by the quantization unit 433, and compares the result with the original near-end input signal to judge whether their LSFs and codebook gains are completely consistent with each other; if yes, the comparison result is outputted to the state judgment unit 436 so that the state judgment unit 436 selects the internal state of the transition module 43 as not requiring a transition, otherwise the current state of the transition module 43 is kept.

Meanwhile, in the embodiment, when the internal state of the transition module 43 becomes a state of not requiring a transition, the transition selection unit 434 judges the result outputted by the echo detection module 41. Once the echo detection module 41 outputs an echo frame, the transition selection unit 434 again make the transition module 43 enter the internal state of requiring a transition, so as to implement a handover from echo to non-echo in time when the next non-echo frame arrives.

Thus in the embodiment of the present invention, when the echo of the near-end input signal does not occur for a long time, the non-echo frames are directly transmitted transparently through a transition selection, and it is unnecessary to calculate the LSF, the fixed codebook gain and the adaptive codebook gain for each frame of the near-end input signal. Further, when a handover is to be made between echo and non-echo, a natural transition is well realized, which greatly decreases of the disk of abnormity occurring, and improves the subjective experiences of the parties concerned in the call.

Finally, the near-end input signal outputted by the comfort noise insertion module 42 or the transition module 43 is inputted into the bit packing module 44, which performs bit packing for the inputted signal according to the information such as frame type and frame rate. Since the bit packing is performed according to the standard protocol, and there are relatively fixed procedures, and it is omitted.

The units included in the above apparatus embodiment are just classified based on the functional logics, but not limited thereto so long as corresponding functions can be realized. In addition, the specific titles of the functional units are also given for the convenience of distinguishing them from each other, rather than limitations to the protection scope of the present invention.

In the embodiment of the present invention, the above described apparatus for echo control in the parameter domain may construct an echo control system of a wireless network together with a wireless base station, a base station controller, a Universal Media Gateway (UMG) and other network elements of gateway type, or construct an echo control system of a PSTN network together with devices such as the Public Switched Telephone Network (PSTN) switchboard. The apparatus provides uplink and downlink communication interfaces, through which uplink and downlink echo control functions in the parameter domain can be provided.

Figure 10:
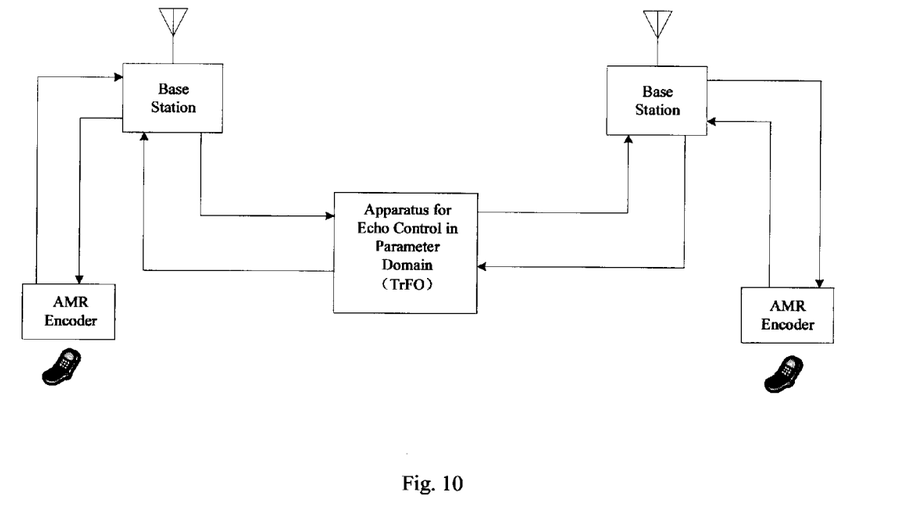
FIG. 10 is a TrFO application scenario under Port A IP or ATM networking for an apparatus for echo control in a parameter domain provided by an embodiment of the present invention.

According to an embodiment of the present invention, as illustrated in FIG. 10, the apparatus for echo control in the parameter domain may be applied to the TrFO scenario under Port A Internet Protocol (IP) or Asynchronous Transfer Mode (ATM) networking. In addition, the apparatus for echo control in the parameter domain may be arranged on the wireless side or the UMG side. Under the above networking scenario, the types of the encoders corresponding to the calling terminal and the called terminal are the same as each other, thus the codec transform is not required, which saves the device cost and improves the voice quality.

Figure 11:
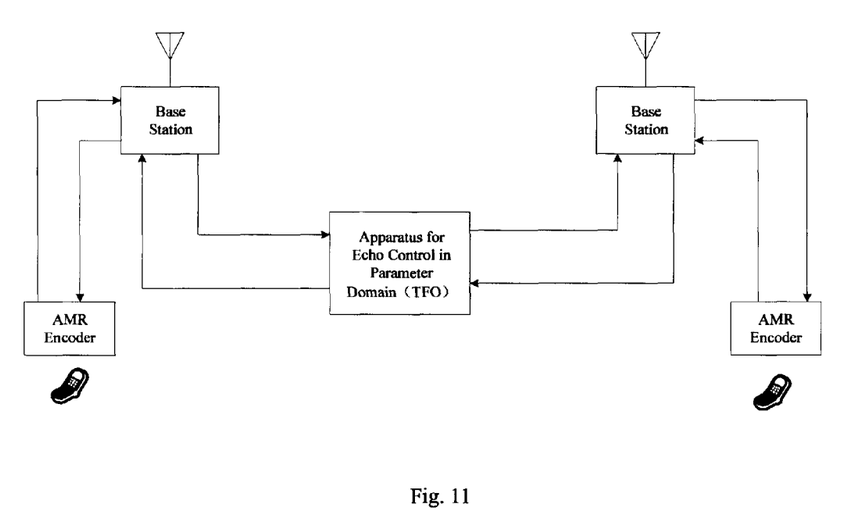
FIG. 11 is a TFO application scenario under Port A TDM networking for an apparatus for echo control in a parameter domain provided by an embodiment of the present invention.

According to an embodiment of the present invention, as illustrated in FIG. 11, the apparatus for echo control in the parameter domain may be applied to the TFO scenario under Port A Time Division Multiplexing (TDM) networking. In addition, the apparatus for echo control in the parameter domain may be arranged on the wireless side or the UMG side. Under the above networking scenario, the types of the encoders corresponding to the calling terminal and the called terminal are also the same as each other, thus the codec transform is not required, but the PCM data transmission mode is still mainly based on. Under the above networking scenario, the echo occurring in the uplink or downlink network element is controlled to improve the subjective experiences.

Figure 12:
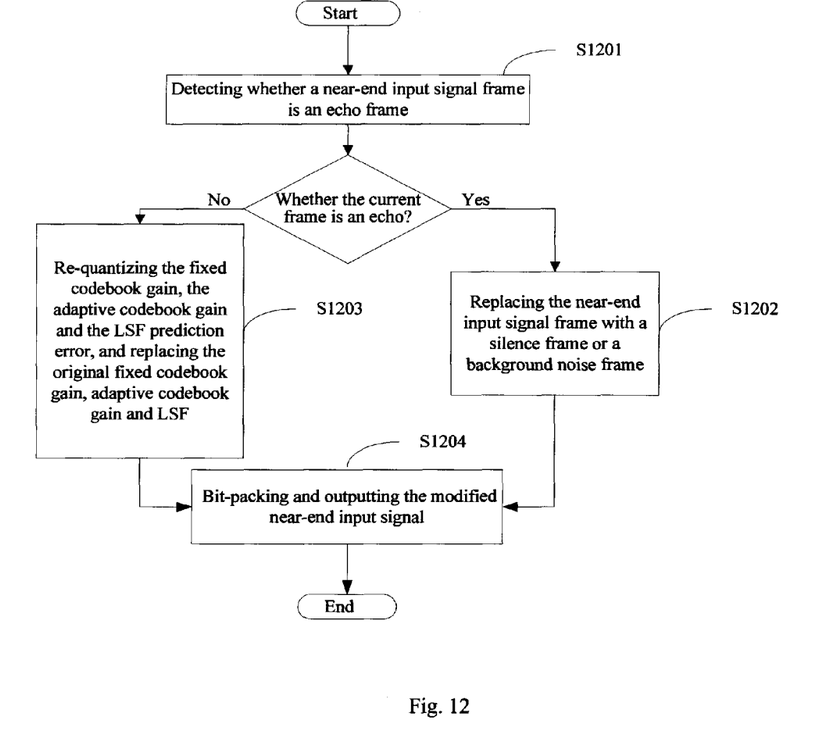
FIG. 12 illustrates a flowchart for implementing a method for echo control in a parameter domain provided by an embodiment of the present invention.

FIG. 12 is an implementation flowchart of a method for echo control in a parameter domain provided according to an embodiment of the present invention. The details are described as follows.

Step S1201: detecting whether a near-end input signal frame is an echo frame according to parameter domain characteristic parameters of a far-end output signal and a near-end input signal, wherein the parameter domain characteristic parameters include LSF, pitch period, fixed codebook gain, adaptive codebook gain and energy.

The embodiment of the present invention performs the echo control in the parameter domain, and the echo can be controlled just by modifying the parameter domain characteristic parameters in the signals, thus firstly the parameter domain characteristic parameters for the echo control are extracted from the far-end output signal and the near-end input signal.

Step S1202: when the near-end input signal frame is detected as an echo frame, replacing the near-end input signal frame with a silence frame or a background noise frame.

The silence frame and the background noise frame are both transmitted in the SID encoding mode with a low bit rate. Thus in the embodiment of the present invention, when an echo frame occurs and an echo cancellation is required, the echo frame is replaced with the silence frame or the background noise frame, thereby reducing the echo control overhead and saving the bandwidth.

Step S1203: when the near-end input signal frame is detected as a non-echo frame, re-quantizing the fixed codebook gain, the adaptive codebook gain and an LSF prediction error in the near-end input signal frame, so as to replace the original fixed codebook gain, adaptive codebook gain and LSF in the near-end input signal frame.

Step S1204: bit-packing and outputting the modified near-end input signal according to the frame type and the frame rate of the near-end input signal frame.

In the embodiment of the present invention, through the above steps, when a handover between echo and non-echo is required during the echo control in the parameter domain, since the LSF prediction error of the currently controlled input signal frame is re-quantized and outputted as an LSF in the near-end output signal, thus the association between the LSF quantization in the current frame and the LSF prediction error in the previous frame is considered during the handover process, thereby avoiding a hard handover between echo and non-echo caused by independently processing the current frame, and improving the transition effect between echo and non-echo.

Next, the flows for implementing the method for echo control in the parameter domain provided by the embodiment of the present invention are specifically described as follows one by one.

Figure 13:
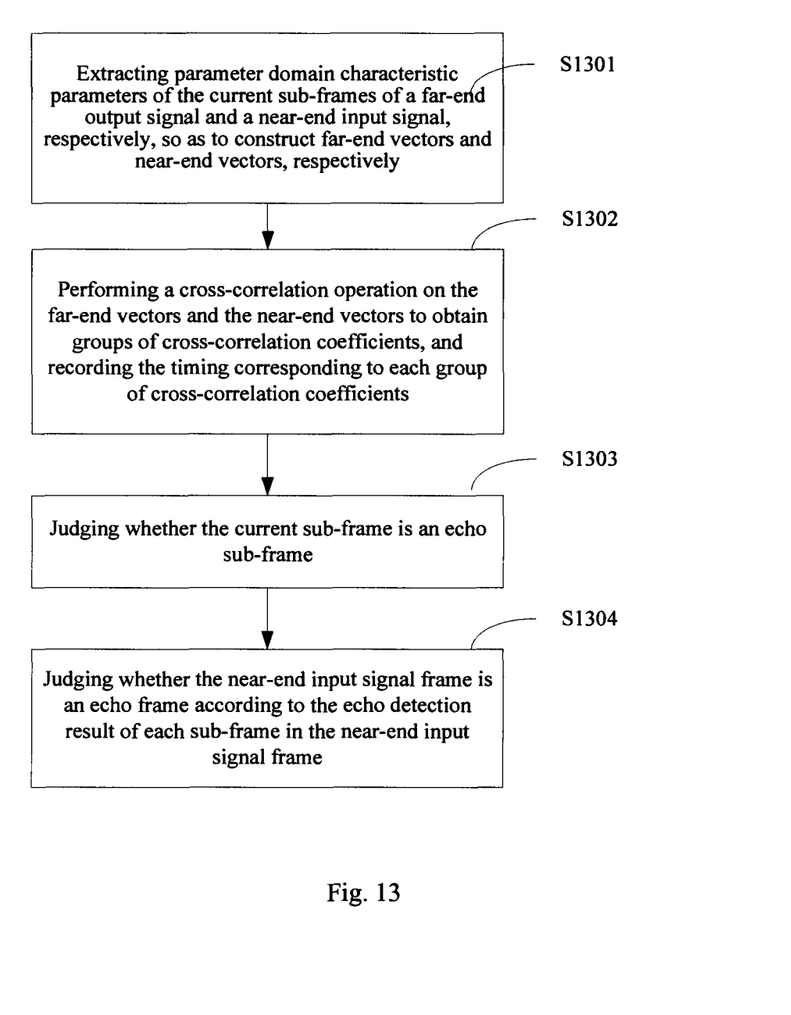
FIG. 13 illustrates a specific flowchart of a method for echo control in a parameter domain provided by an embodiment of the present invention to detect whether the near-end input signal frame is an echo frame.

FIG. 13 illustrates a specific flow for detecting whether a near-end input signal frame is an echo frame. The details are described as follows.

Step S1301: extracting parameter domain characteristic parameters of the current sub-frames of the near-end input signal and the far-end output signal, respectively, and taking them as near-end vectors and far-end (interval [fixed delay, fixed delay+dynamic delay]) vectors, respectively.

Step S1302: performing a cross-correlation operation on the near-end vectors and far-end vectors to obtain groups of cross-correlation coefficients, and recording the timing corresponding to each group of cross-correlation coefficients.

Step S1303: taking the timing corresponding to the maximum cross-correlation coefficient as an initial echo delay; thus, judging whether the current sub-frame is an echo sub-frame by detecting the similarity between the far-end and near-end pitch periods at this timing, or by detecting whether the difference between the far-end and near-end energies is below a predetermined threshold; and if yes, the current sub-frame of the near-end input signal is an echo sub-frame, otherwise it is a non-echo sub-frame.

The above steps S1301 to S1303 are all processing of the sub-frame, thus in step S1304, a synthetic judgment is made based on the echo detection result of each sub-frame in the near-end input signal frame, so as to judge whether the near-end input signal frame is an echo frame.

Figure 14:
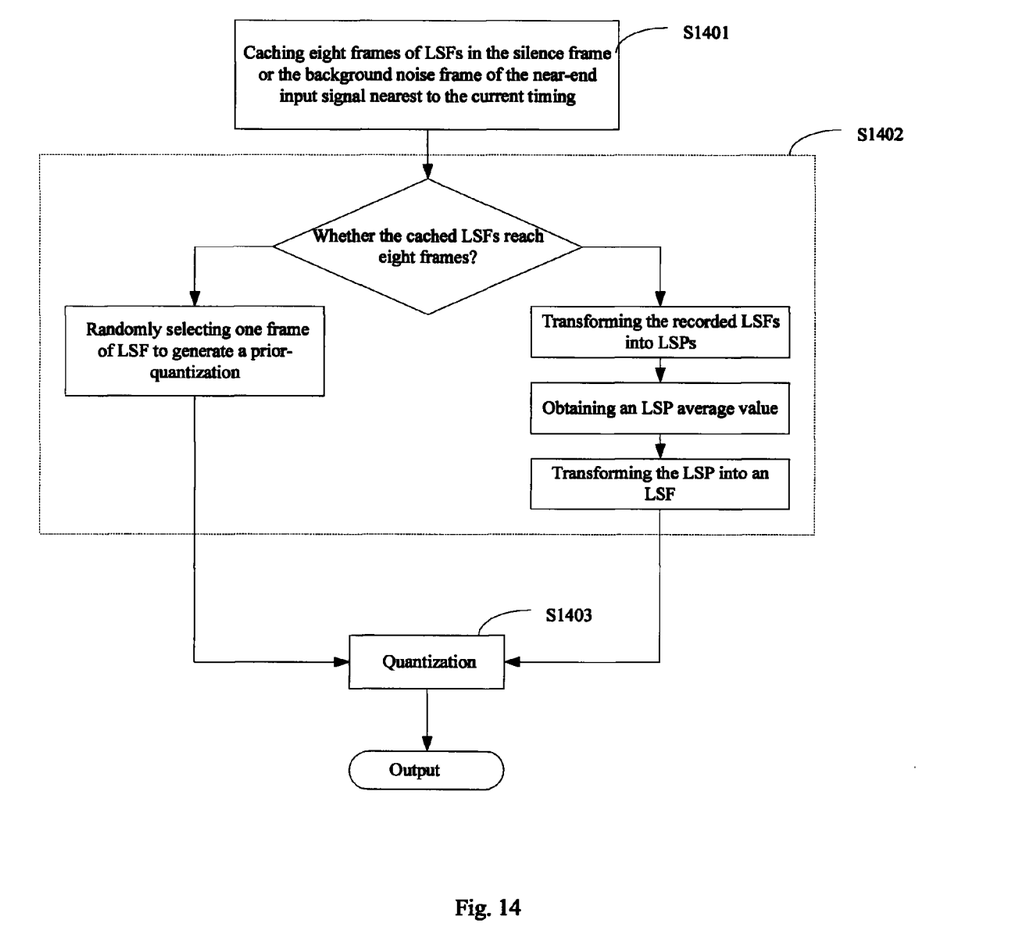
FIG. 14 illustrates a specific flowchart of a method for echo control in a parameter domain provided by an embodiment of the present invention to replace an echo frame when the near-end input signal frame is the echo frame.

FIG. 14 illustrates a specific flow for implementing the replacement of an echo frame when the near-end input signal frame is an echo frame.

Step S1401: judging whether the near-end input signal frame is a silence frame or a background noise frame, and if yes, caching eight frames of LSFs in the silence frame or the background noise frame of the near-end input signal nearest to the current timing.

Step S1402: judging whether the cached LSFs reach eight frames, and if yes, randomly selecting one frame of LSF to generate a prior-quantization LSF, otherwise transforming each cached frame of LSF into a Line Spectral Pair (LSP) and accumulating to obtain an LSP average value, then transforming the LSP average value into an LSF to generate the prior-quantization LSF.

Step S1403: quantizing the generated prior-quantization LSF to replace the original LSF of the near-end input signal frame.

Meanwhile, in the embodiment when the near-end input signal frame is the silence frame or the background noise frame, a long-term average accumulation of the energy of the silence frame or the background noise frame of the near-end input signal is carried out to generate an energy long-term accumulation average value, which is quantized to replace the original energy of the near-end input signal frame, so that the frame energy after the echo replacement is changed slowly and transited naturally.

Figure 15:
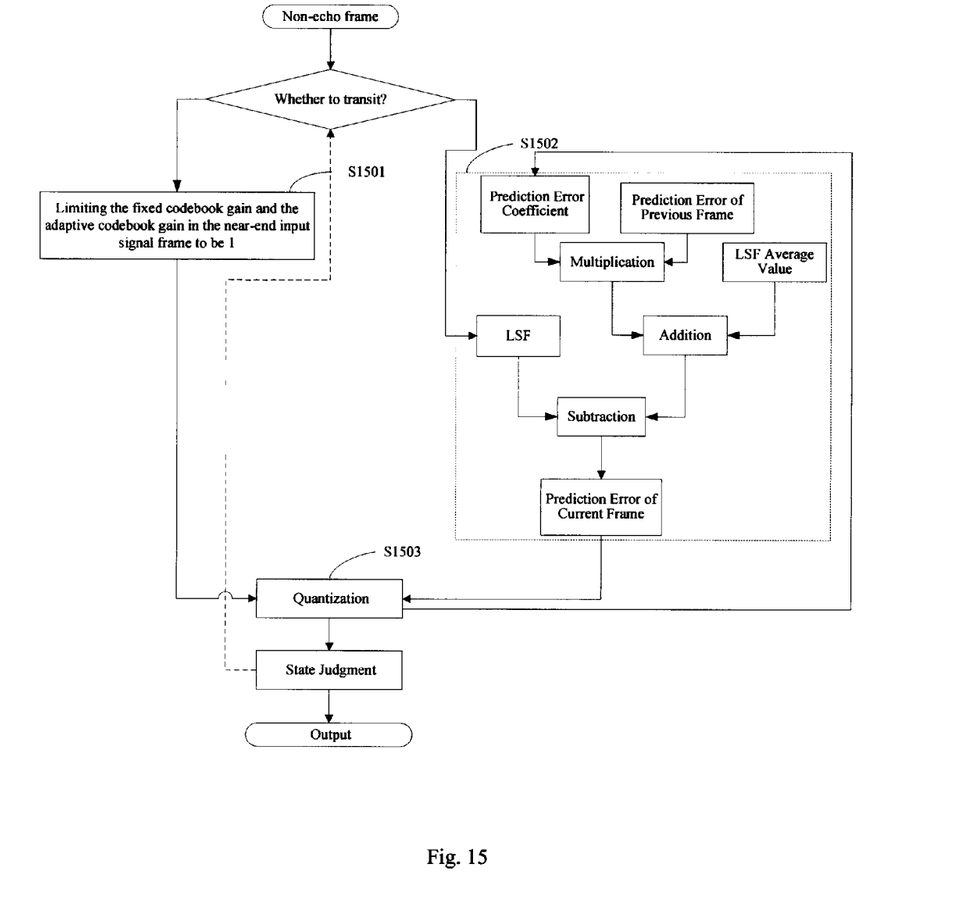
FIG. 15 illustrates a specific flowchart of a method for echo control in a parameter domain provided by an embodiment of the present invention when the near-end input signal frame is a non-echo frame.

FIG. 15 illustrates a specific flow for implementing a method for echo control when the near-end input signal frame is a non-echo frame.

Step S1501: judging whether the fixed codebook gain or the adaptive codebook gain of the non-echo near-end input signal frame exceeds 1, and if yes, limiting its value as 1.

Through the above limitation, it is ensured that the excitation after the near-end output signal is decoded will not be mutated during the transition from echo to non-echo.

Step S1502: multiplying the LSF prediction error of a previous near-end input signal frame with an LSF prediction error coefficient, and adding the multiplication result with an LSF average value to obtain an LSF prediction value of the current near-end input signal frame; subtracting the LSF prediction value from the LSF of the near-end input signal frame to obtain an LSF prediction error of the current near-end input signal frame prior to quantization, wherein the LSF prediction error coefficient and the LSF average value are determined by the encoding mode of the near-end input signal frame.

Step S1503: re-quantizing the codebook gain and the LSF prediction error obtained in the above step.

Further, after the above steps are ended, as illustrated in FIG. 15, the re-quantized near-end input signal is compared with the original near-end input signal to judge whether their LSFs and codebook gains are completely consistent with each other, and if yes, returning to corresponding state without performing a transition for the near-end input signal. In case the near-end input signal is not transited, steps S1501 to S1503 are not performed, but the near-end input signal is directly outputted after the LSF prediction error of the near-end input signal frame is recorded. Therefore, if no echo is generated for a long time, the direct transparent transmission avoids the quantization of parameters such as the codebook gains each time, and greatly decreases the echo control overhead.

During a call echo control in the parameter domain by the embodiment of the present invention, when a handover between echo and non-echo is required, it is realized by re-quantizing the fixed codebook gain and the adaptive codebook gain of the current frame. Meanwhile, the LSF prediction error of the current frame is re-quantized to replace the original LSF output in the near-end output signal. Thus the association between the frames is considered during the handover, thereby avoiding a hard handover between echo and non-echo caused by independently processing the current frame, and improving the transition effect between echo and non-echo.

A person skilled in the art shall be appreciated that in the method for echo control in the parameter domain provided by the embodiment of the present invention, all or a part of the steps may be completed by instructing relevant hardware through a program, for example by running a program in the computer. The program may be stored in a readable access medium, such as RAM, magnetic disk, optical disk, etc.

What is claimed is:

1. An apparatus for echo control in a parameter domain, comprising:
    an echo detection module configured to extract parameter domain characteristic parameters of a far-end output signal and a near-end input signal, respectively, through a parameter domain decoding, and detect whether a near-end input signal frame is an echo frame according to the parameter domain characteristic parameters, wherein the parameter domain characteristic parameters comprise a Line Spectrum Frequency (LSF), a fixed codebook gain and an adaptive codebook gain; and
    a transition module configured to, when the echo detection module detects the near-end input signal frame as a non-echo frame during a handover from echo to non-echo, re-quantize the fixed codebook gain, the adaptive codebook gain and an LSF prediction error in the near-end input signal frame, and replace the original fixed codebook gain, the original adaptive codebook gain and the original LSF in the near-end input signal frame with the re-quantized fixed codebook gain, the re-quantized adaptive codebook gain and the re-quantized LSF prediction error in the near-end input signal frame.

2. The apparatus according to claim 1, wherein the parameter domain characteristic parameters further comprise pitch period and energy, and the echo detection module comprises:
    a partial decoding unit configured to extract the parameter domain characteristic parameters of the current sub-frame of the far-end output signal and the near-end input signal, respectively, so as to construct far-end vectors and near-end vectors, respectively;
    a cross-correlation unit configured to perform a cross-correlation operation on the far-end and near-end vectors to obtain groups of cross-correlation coefficients, and record the timing corresponding to each group of cross-correlation coefficients;
    a sub-frame judgment unit configured to judge whether the current sub-frame is an echo sub-frame by detecting the similarity between far-end pitch period and near-end pitch period at the timing corresponding to the maximum cross-correlation coefficient, or by detecting whether the difference between far-end energy and near-end energy is below a predetermined threshold; and
    an echo judgment unit configured to judge whether the near-end input signal frame is an echo frame according to the echo detection result of each sub-frame in the near-end input signal frame.

3. The apparatus according to claim 1, wherein the transition module comprises:
    an LSF prediction error calculation unit configured to obtain an LSF prediction value of the current near-end input signal frame by multiplying an LSF prediction error of a previous near-end input signal frame with an LSF prediction error coefficient and adding the multiplication result with an LSF average value; and obtain an LSF prediction error of the current near-end input signal frame prior to quantization by subtracting the LSF prediction value from the LSF outputted by the echo detection module, wherein the LSF prediction error coefficient and the LSF average value are both constants and determined according to the encoding mode of the near-end input signal frame;
a codebook gain calculation unit configured to limit the fixed codebook gain or the adaptive codebook gain larger than 1 in the near-end input signal frame to be 1; and
a quantization unit configured to quantize the LSF prediction error obtained by the LSF prediction error calculation unit, as well as the fixed codebook gain and the adaptive codebook gain outputted by the codebook gain calculation unit, and replace the original LSF, the original fixed codebook gain and the original adaptive codebook gain in the near-end input signal frame, respectively.

4. The apparatus according to claim 3, wherein the transition module further comprises:
a transition selection unit configured to determine whether the transition module transits the near-end input signal frame;
a parameter recording unit configured to record the LSF prediction error of the near-end input signal frame when the transition module does not transit the near-end input signal frame; and
a state judgment unit configured to compare the near-end input signal outputted by the quantization unit with the near-end input signal outputted by the echo detection module, and when their LSFs, fixed codebook gains and adaptive codebook gains are consistent with each other, make the transition selection unit select not to transit the near-end input signal frame, otherwise keep the current state of the transition selection unit.

5. The apparatus according to claim 1, further comprising:
a comfort noise insertion module configured to replace the near-end input signal frame with a silence frame or a background noise frame when the echo detection module detects the near-end input signal frame as an echo frame, and encode using a Silence Insertion Descriptor (SID) encoding mode.

6. The apparatus according to claim 5, wherein the echo detection module comprises:
a near-end input judgment unit configured to judge whether the near-end input signal frame is a silence frame or a background noise frame;
a cache unit configured to cache LSFs of the silence frame or the background noise frame of the near-end input signal, wherein the cache unit caches eight frames of LSFs nearest to the current timing;
the comfort noise insertion module comprises:
an LSF generation unit configured to generate a prior-quantization LSF according to the LSFs cached in the cache unit;
an LSF quantization unit configured to quantize the LSF generated by the LSF generation unit, and replace the original LSF in the near-end input signal frame.

7. The apparatus according to claim 6, wherein the LSF generation unit randomly selects one frame of LSF from the cache unit to generate a prior-quantization LSF when the cache unit caches eight frames of LSFs; and
when the LSFs cached by the cache unit are less than eight frames, the LSF generation unit transforms each frame of LSF cached in the cache unit into a Line Spectral Pair (LSP) and accumulates the transformed LSP to obtain an LSP average value, then transforms the LSP average value into an LSF to generate the Prior-quantization LSF.

8. The apparatus according to claim 5, wherein the parameter domain characteristic parameters further comprise energy, and the echo detection module comprises:
an energy accumulation unit configured to perform a long-term average accumulation of the energy of the silence frame or the background noise frame of the near-end input signal to generate an energy long-term accumulation average value;
the comfort noise insertion module comprises:
an energy quantization unit configured to quantize the energy long-term accumulation average value to replace the original energy of the near-end input signal frame.

9. The apparatus according to claim 1, further comprising:
a bit packing module configured to perform bit packing for the near-end input signal outputted by the transition module or the comfort noise insertion module according to the frame type and the frame rate of the near-end input signal frame, and output it as a near-end output signal.

10. A method for echo control in a parameter domain, comprising:
detecting whether a near-end input signal frame is an echo frame according to parameter domain characteristic parameters of a far-end output signal and a near-end input signal, wherein the parameter domain characteristic parameters comprise LSF, fixed codebook gain and adaptive codebook gain; and
when the near-end input signal frame is detected as an echo frame during a handover from echo to non-echo, re-quantizing the fixed codebook gain, the adaptive codebook gain and the LSF prediction error in the near-end input signal frame and replacing the original fixed codebook gain, the original adaptive codebook gain and the original LSF in the near-end input signal frame with the re-quantized fixed codebook gain, the re-quantized adaptive codebook gain and the re-quantized LSF prediction error in the near-end input signal frame, respectively.

11. The method according to 10, wherein detecting whether the near-end input signal frame is an echo frame according to the parameter domain characteristic parameters of the far-end output signal and the near-end input signal comprises:
extracting the parameter domain characteristic parameters of the current sub-frames of the far-end output signal and the near-end input signal, respectively, so as to construct far-end vectors and near-end vectors, respectively, wherein the parameter domain characteristic parameters further comprise pitch period and energy;
performing a cross-correlation operation on the far-end vectors and the near-end vectors to obtain groups of cross-correlation coefficients, and recording the timing corresponding to each group of cross-correlation coefficients;
judging whether the current sub-frame is an echo sub-frame by detecting the similarity between far-end pitch period and near-end pitch period at the timing corresponding to the maximum cross-correlation coefficient, or by detecting whether the difference between far-end energy and near-end energy is below a predetermined threshold; and
judging whether the near-end input signal frame is an echo frame according to the echo detection result of each sub-frame in the near-end input signal frame.

12. The method according to 10, wherein re-quantizing the fixed codebook gain and the adaptive codebook gain in the near-end input signal frame comprises:

limiting the fixed codebook gain or the adaptive codebook gain larger than 1 in the near-end input signal frame to be 1; and quantizing the fixed codebook gain and the adaptive codebook gain which have been limited.

13. The method according to 10, wherein re-quantizing the LSF prediction error in the near-end input signal frame comprises:

obtaining an LSF prediction value of the current near-end input signal frame by multiplying the LSF prediction error of a previous near-end input signal frame with an LSF prediction error coefficient and adding the multiplication result with an LSF average value, wherein the LSF prediction error coefficient and the LSF average value are both constants and determined according to the encoding mode of the near-end input signal frame;

obtaining an LSF prediction error of the current near-end input signal frame prior to quantization by subtracting the LSF prediction value from the LSF of the near-end input signal frame; and quantizing the LSF prediction error.

14. The method according to 13, wherein when the near-end input signal frame is a non-echo frame, the method further comprises:

comparing the re-quantized near-end input signal with the original near-end input signal to judge whether their LSFs, fixed codebook gains and adaptive codebook gains are completely consistent with each other, and if yes, selecting not to transit the next near-end input signal frame, otherwise continuously transiting the near-end input signal frame; and recording the LSF prediction error of the near-end input signal frame when the near-end input signal frame is not to be transmitted.

15. The method according to claim 10, wherein when the near-end input signal frame is detected as an echo frame, the method further comprises:

replacing the near-end input signal frame with a silence frame or a background noise frame, and performing encoding by using a Silence Insertion Descriptor (SID) encoding mode.

16. The method according to claim 15, wherein replacing the near-end input signal frame with a silence frame or a background noise frame comprises:

judging whether the near-end input signal frame is a silence frame or a background noise frame, and if yes, caching eight frames of LSFs of the silence frame or the background noise frame of the near-end input signal nearest to the current timing;

generating a prior-quantization LSF according to the cached LSF; and quantizing the generated prior-quantization LSF to replace the original LSF in the near-end input signal frame.

17. The method according to claim 16, wherein generating the prior-quantization LSF according to the cached LSF comprises:

when the cached LSFs reach eight frames, randomly selecting one frame of LSF to generate the prior-quantization LSF;

when the cached LSFs are less than eight frames, transforming each cached frame of LSF into a Line Spectral Pair (LSP) and accumulating the LSP to obtain an LSP average value, then transforming the LSP average value into an LSF to generate the prior-quantization LSF.

18. The method according to claim 15, further comprising:

performing a long-term average accumulation of the energy of the silence frame or the background noise frame of the near-end input signal to generate an energy long-term accumulation average value; and quantizing the energy long-term accumulation average value to replace the original energy of the near-end input signal frame.

19. The method according to claim 10, further comprising:

performing bit packing for the modified near-end input signal according to the frame type and the frame rate of the near-end input signal frame, and outputting it.

* * * * *